Nov. 13, 1951     C. H. PRESCOTT, JR     2,574,842
METHOD AND APPARATUS FOR PURIFYING
AND PACKAGING URANIUM HEXACHLORIDE
Filed Sept. 2, 1944     3 Sheets-Sheet 1
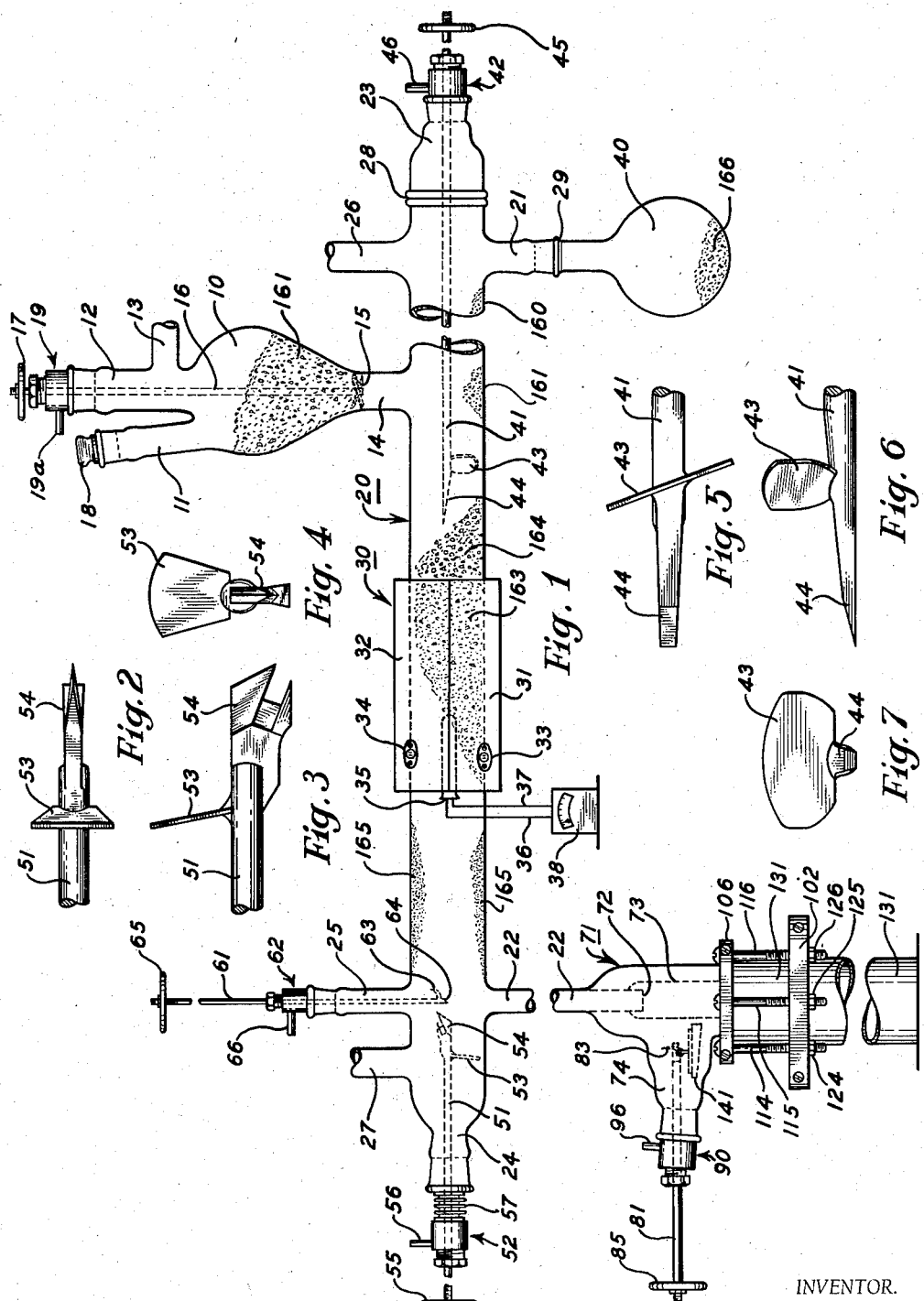
INVENTOR.
CHARLES H. PRESCOTT JR.
BY
ATTORNEY.

Nov. 13, 1951
C. H. PRESCOTT, JR  
METHOD AND APPARATUS FOR PURIFYING  
AND PACKAGING URANIUM HEXACHLORIDE
2,574,842
Filed Sept. 2, 1944
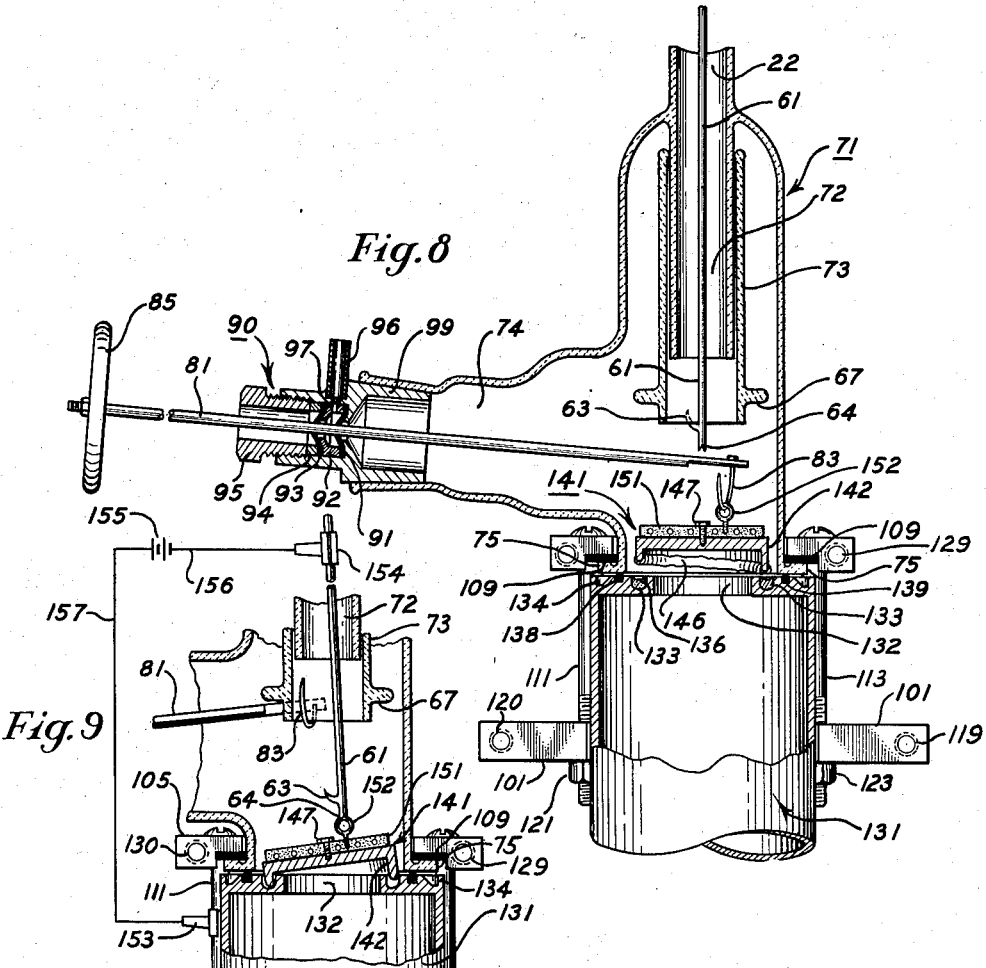
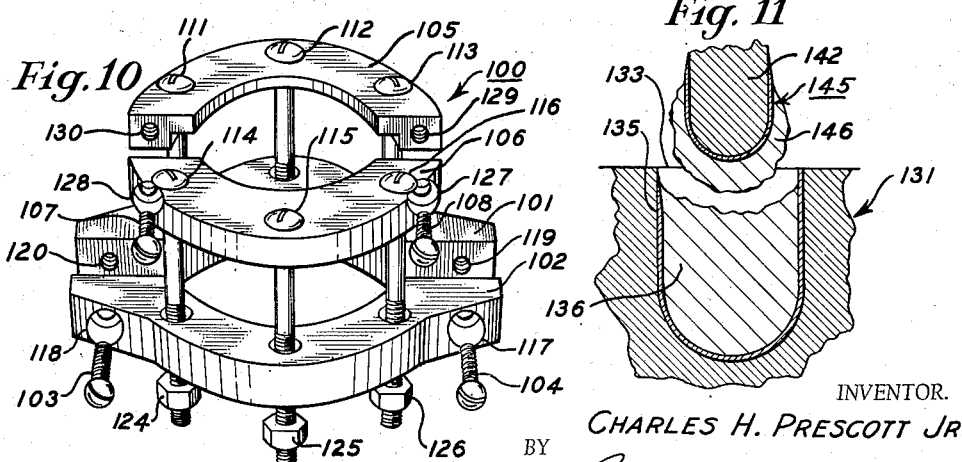
INVENTOR.  
CHARLES H. PRESCOTT JR.  
BY  
ATTORNEY.

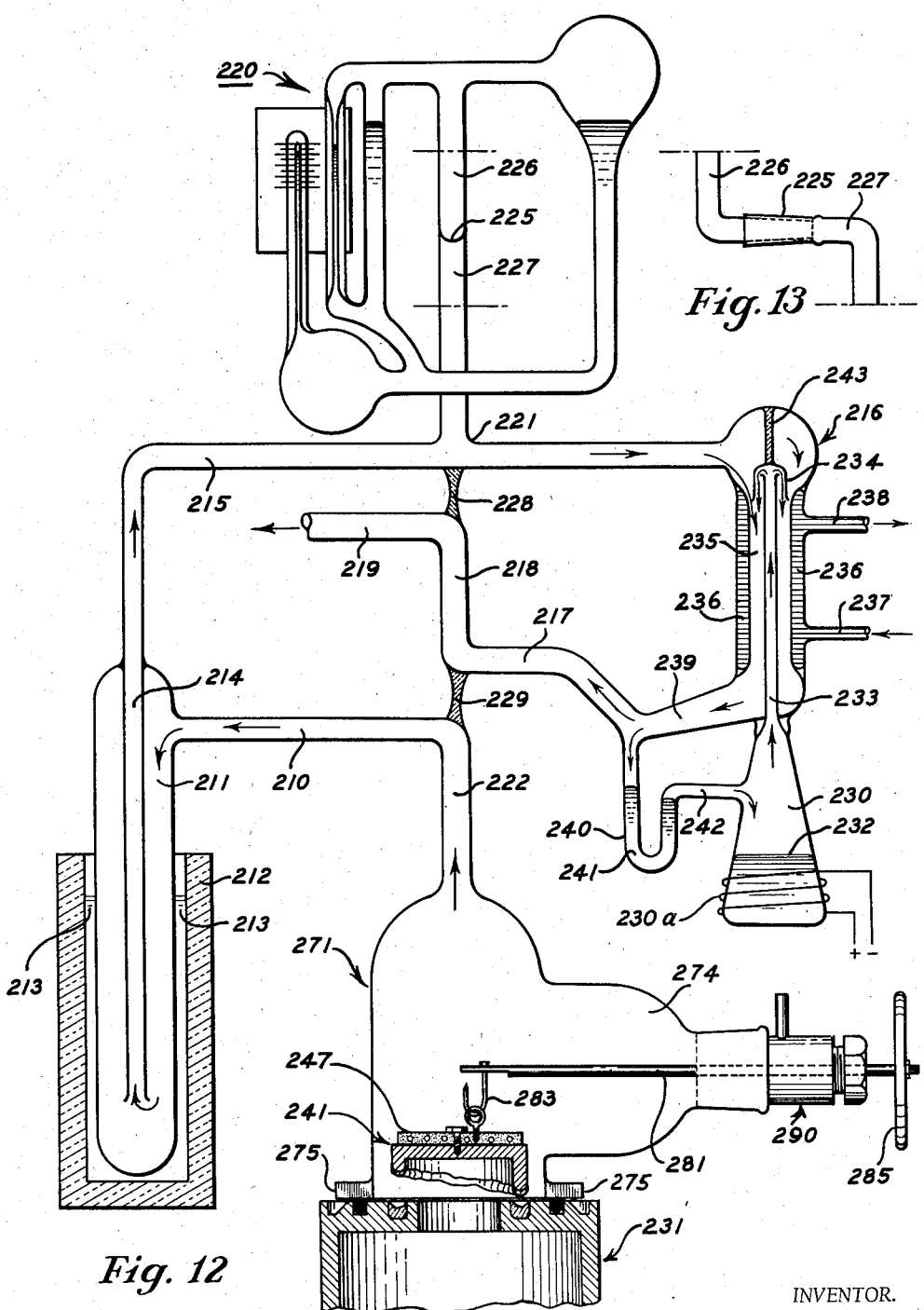

Patented Nov. 13, 1951

2,574,842

UNITED STATES PATENT OFFICE 2,574,842

METHOD AND APPARATUS FOR PURIFYING AND PACKAGING URANIUM HEXACHLORIDE

Charles H. Prescott, Jr., Berkeley, Calif., assignor to the United States of America as represented by the United States Atomic Energy Commission Application September 2, 1944, Serial No. 552,556

3 Claims. (Cl. 23—14.5)

This invention relates to processes of an apparatus for packaging, and especially to closing, in the absence of air, receptacles containing material that is rapidly decomposed or otherwise affected deleteriously when exposed to atmospheric conditions. More particularly, it appertains to the purification of, and the filling of vaporizing vessels with, a uranium chloride and to the hermetic sealing, under vacuum, of the charged vessels.

There is a present need for large quantities of the uranium isotope having mass number 235. Uranium as obtained from natural sources comprises the aforementioned isotope mixed with two others having the mass numbers 234 and 238, in the ratio $U^{234}:1::U^{235}:120::U^{238}:16,700$.

An apparatus capable of effecting a separation of desired components from a mixture of these isotopes, is called a "calutron." Such a calutron essentially comprises means for vaporizing a quantity of material containing an element (for example, uranium) which is to be enriched with a selected one of its plurality of isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electromagnetic means for deflecting the ions along curved paths, the radii of curvature of the paths of the ions being proportional to the square roots of the masses of the ions, whereby the ions are concentrated in accordance with their masses; and means for de-ionizing and collecting the ions of the selected isotopes thus concentrated, thereby to produce a deposit of the element enriched with the selected isotope.

The device for supplying the vapor of a material, such as a uranium compound, that is to be treated in a calutron ordinarily comprises a heater with a tubular chamber in which is set a vaporizing vessel, commonly called a "charge bottle," containing a charge of a uranium compound that volatilizes readily upon heating. Uranium hexachloride, which can be satisfactorily sublimed at about 100° C. under $10^{-4}$ mm. mercury vacuum, has been found to be especially suitable for charging these devices. Likewise, uranium tetrachloride although normally less volatile is suitable for this purpose. However, both uranium tetrachloride and uranium hexachloride are highly hygroscopic compounds and decompose readily when exposed to atmospheric conditions.

For example, when uranium hexachloride is loaded into a charge bottle under ordinary atmospheric conditions, the uranium hexachloride particles usually become covered with a coating, probably uranyl chloride ($UO_2Cl_2$). This coating impedes volatilization, thereby necessitating higher vaporizing temperatures which, in turn, induce decomposition of the charge to relatively involatile uranium compounds.

The invention has for an object the vacuum packaging of a hygroscopic material such as hygroscopic uranium compounds. Other objects are to fill and seal calutron charge bottles under vacuum, to provide a satisfactory process and apparatus for purifying and packaging uranium compounds under vacuum, and to seal hermetically vacuum containers charged with uranium compounds. Further objects are the production of a package comprising a wide-mouthed metal bottle having a closure soldered thereto and containing uranium hexachloride under vacuum; the prevention of deterioration during preparation, purification, packaging, storage, transport, etc., of uranium hexachloride; and the sublimation and storage of uranium hexachloride in vacuums as high as $10^{-4}$ mm. Hg absolute. Additional objects are to isolate a uranium chloride in a vacuum, to sublime a uranium chloride in a vacuum, to purify a uranium chloride in a vacuum, and to store a uranium chloride in a vacuum. A general advance in the art and other objects which will appear hereinafter are also contemplated.

In accordance with this invention, a process has been discovered and an apparatus originated for packaging a volatile, hygroscopic uranium compound comprising subliming a hygroscopic uranium compound, condensing the sublimed compound, charging a container with the sublimed compound, and hermetically sealing the container, all of the operations being conducted without exposing the hygroscopic uranium compound to the atmosphere. Uranium compounds which are suitable for use in this process are uranium hexachloride, uranium tetrachloride, and the like.

An apparatus suitable for purifying and packaging the hygroscopic uranium compound comprises a subliming chamber, a condensing chamber joined thereto, a storage receptacle and a conduit connecting the condensing chamber and storage receptacle, means for maintaining a vacuum in the apparatus, means for heating the subliming chamber whereby the uranium compound is sublimed into and condensed in the condensing chamber, means for moving the sublimed and condensed uranium compound into the conduit and the storage receptacle, and means for hermetically sealing the charged storage receptacle.

How the foregoing objects and related ends are accomplished will be apparent from the following description including the principle, the organization and divers embodiments of the invention, and the best mode contemplated for carrying out the same. Parts are given by weight throughout the description; and the description is amplified by the accompanying drawings, in which:

Fig. 1 is a fragmentary side elevational view of combined charge purifying and charge bottle filling and sealing apparatus embodying the features of the invention.

Fig. 2 is a fragmentary plan view of the end of the material moving device employed in the condensing end of the apparatus of Fig. 1.

Fig. 3 is a side elevational view of the device of Fig. 2.

Fig. 4 is an end elevational view of the device of Fig. 2.

Fig. 5 is a fragmentary plan view of the end of the material moving device employed in the feeder end of the apparatus of Fig. 1.

Fig. 6 is a side elevational view of the device of Fig. 5.

Fig. 7 is an end elevational view of the device of Fig. 5.

Figs. 8 and 9 are enlarged fragmentary side elevational views, partly in section, of the apparatus of Fig. 1, illustrating the closing hood and the storage bottle secured thereto, certain of the parts being shown in different manipulated positions.

Fig. 10 is an enlarged perspective view of the parts of the frame which is employed to secure the storage bottle to the closing hood, certain of the parts being illustrated in exploded position.

Fig. 11 is a greatly enlarged fragmentary sectional view of the upper portion of the charge bottle and the bottle cap, illustrating the sealing arrangement therebetween.

Fig. 12 is a side elevational view, partly in section, of a modified form of charge bottle sealing apparatus embodying the features of the invention.

Fig. 13 is a fragmentary side elevational view of a pivot joint embodied in the McLeod gauge forming a part of the apparatus of Fig. 12.

Referring now to Figs. 1 to 7, inclusive, of the drawings, there is illustrated a purifying and packaging apparatus constructed largely of glass and comprising a hopper 10 in which the material to be processed is placed before the purification operation is started. A hopper having a capacity of about one liter is suitable. This hopper has a conduit 11 through which it is filled with raw material, a tubular extension 12 designed to receive a conventional high vacuum type of seal, such as described in vol. 12 (1941) pages 41–43, Review of Scientific Instruments and generally known as a Wilson seal, such seal 19 having a vacuum testing connection tube 19a, and a duct 13 for connection to a vacuum-producing apparatus (not shown). A removable plug 18 fitting tightly in the conduit 11 closes this part of the apparatus against the ingress of air.

Raw material is released from the hopper as desired by means of a feeding device comprising a stainless steel disk-like gate 15. This gate, comprising two slightly warped semicircular metal sheets, is carried on a rod 16 that extends through the Wilson seal 19 and is operated by a handwheel 17. A cylindrical rod made of one-quarter inch stainless or ordinary carbon steel stock is suitable. Rotation of the handwheel 17 produces rotation of the gate 15 which thereupon functions like a feed screw to release material from the hopper in conventional manner.

The hopper 10 is connected to a subliming container or kiln 20 by means of a duct 14, through which the raw material is delivered by gravity when released by the gate 15. Ordinarily, the container 20 is a 2.25-inch diameter Pyrex glass cylinder about 50 inches long. The container 20 has two downwardly extending delivery ducts or tubes 21 and 22. The sublimed and purified material is transmitted to a charge bottle or other receptacle 131 through the tube 22, and unsublimed material is moved through the tube 21 to a receptacle 40 connected thereto at 29. The container 20 also has tubular extensions 23, 24 and 25 constituting portals for the devices that manipulate the materials being processed, and two ducts 26 and 27, located exteriorly of the path of the material as it is processed, for connections to apparatus capable of producing a vacuum of at least $10^{-4}$ mm. of mercury. A gastight joint 28 is provided to facilitate assembling and cleaning of the apparatus.

Near its center the horizontally disposed container 20 has a subliming zone surrounded by a furnace 30. This furnace consists of two semi-cylindrical electrical resistance heaters 31 and 32, capable of raising the batch of material being processed to its volatilization temperature. The temperature commonly reached in subliming uranium hexachloride in this apparatus is about 150° to 180° C., or even as high as 210° C. The heaters have individual electrical connections 33 and 34 for a source of heating current. The heater sections are constructed to provide space for a thermocouple well 35. The thermocouple therein (not shown) is connected by conductors 36 and 37 to an indicating and/or recording instrument 38, such as a potentiometer or voltmeter, which may be suitably calibrated to indicate and/or record directly in terms of the temperature prevailing within the subliming zone.

For moving material inside the vessel 20 at the feeder end, an implement comprising a rod 41 carrying a chisel 44 and a hoe 43 is provided. To insure adequate rigidity, this rod should be about one-quarter inch in diameter. The rod 41 extends through a conventional Wilson seal 42 in the tubular extension 23, and carries on its external end a handwheel 45 by which the implement is manipulated. The chisel 44 and hoe 43 are ordinarily made of stainless steel. The hoe is preferably in the form of an approximately 120° helical sector, tilted at an angle of about 22.5° to a plane normal to the axis of the rod, so that by rotating the rod 41 the hoe can be screwed into the mass of granular material in the chamber without pushing the entire mass of material forward, thus breaking up lumps or aggregates of the material.

For testing the gastightness of the connection around the rod 41, the Wilson seal 42 has, as is usual with these devices, a lateral tube 46 for connection to vacuum-producing apparatus.

At the delivery end of the container 20, in the tubular extension 24, there is a similar material manipulating arrangement comprising a rod 51 carrying a chisel 54 and a scraper blade 53, a surface of which is substantially normal to the axis of the rod. As clearly shown in Figs. 1 to 4, the chisel portion 54 comprises one chisel surface adapted to contact more or less closely the wall surface of chamber 29 in order to scrape sublimate therefrom, and a second chisel surface extending ahead of, and substantially at right angles to, the first chisel surface, thereby functioning to split portions of the sublimate away from the main bulk thereof before the first chisel surface can develop a wedge action upon the main mass of sublimate when the tool is driven in a direction generally parallel to the wall surface. It will also be noted that the second chisel surface slopes with respect to the axis of the rod, forming a relatively sharp trihedral angle at the outermost point, the whole thereby forming a most effective chisel.

The rod 51 extends through an improved Wilson seal 52 and carries, exteriorly of the container 29, a handwheel 55 by which it is manipulated. This rod is preferably made of quarter-inch round stock. The diaphragm case or holder of the Wilson seal carries the customary vacuum connection tube 56.

The improved Wilson seal 52 is of a new design, being specially constructed to allow more than the usual (12°) deflection for the rod 51, as is customary in the conventional Wilson seal, such as seal 42. This improved seal is described in U. S. Patent to Starr 2,442,622. The greater range of movement is obtained by an arrangement including a swivel joint. This joint, located between the case carrying the diaphragms (not shown) and the plug fitting into the extension 24, is covered by a conventional flexible thin metal bellows 57. This bellows is soldered to the aforementioned parts to better maintain the vacuum inside.

The tubular extension 25 on top of the container 29 carries a conventional Wilson seal 62, incorporating a vacuum tseting connection tube 66. A rod 61, which extends through the Wilson seal 62, has a pointed and/or notched end 64 and carries adjacent thereto a small hook 63 pointing in substantially the opposite direction. This rod is conveniently made from one-eighth inch round stock. A handwheel 65 at the external end is utilized for imparting movement to the device.

Referring now to Figs. 8 to 10, inclusive, the duct 22 projects into a hood 71 and terminates in a nozzle 72 which is surrounded by a telescoping spout 73. During the time the charge bottle 131 is being filled, this spout projects into the bottle mouth and is supported on the bottle top by an integral, laterally projecting flange 67. This arrangement forms a continuous passage, whereby material falling through the duct 22 is conducted into the interior of the charge bottle, thereby avoiding an accumulation of charge material in fine particle or dust form on the top of the bottle adjacent the closure, which accumulation of material would interfere with sealing the closure.

The hood 71 comprises a flange 75 conforming to the top of the bottle 131 and a laterally extending tubular portion 74 that forms a housing for a rod 81 that is supported within a conventional Wilson seal 90. This rod, preferably of one-quarter inch round stock, is manipulated by a handwheel 85 and carries on its inner end a hook 83 which, during the bottle filling operation, supports a cap 141 for the charge bottle 131 in a position within the lateral extension 74 where the cap cannot interfere with the descent of material into the charge bottle (Fig. 1 position). The hook 63 on the rod 61 supports the telescopic spout 73 above the mouth of the charge bottle 131 while the bottle is being capped (Fig. 8 position).

The conventional Wilson seal 90 that closes the tubular extension 74 comprises a plug part 99 having a seat upon which a rubber diaphragm 91 is supported. A circular spacer 92 engages the diaphragm 91 and, in turn, is engaged by a second rubber diaphragm 93. This assembly is maintained in position by a washer 94 and a screw plug 95. A vent 97 in the annular piece 92 connects the space between the rubber diaphragms 91 and 93 to a tube 96. This tube is employed as a vacuum connection for testing the adequacy of the seal made between the rod 81 and the two diaphragms 91 and 93. By evacuating the tube 96, it is possible to determine before the processing of material is started whether or not a gastight seal between the rod 81 and the plug 99 is formed by either or both of the diaphragms 91 and 93.

The charge bottle 131 is cylindrical in shape and has a circular mouth 132 in the top. Surrounding the mouth is a groove 133 designed to receive the depending skirt or flange 142 of the cap 141 and a groove 139 for packing purposes. Ordinarily, the mouth 132 and grooves 133 and 139 are located concentrically in the top of the bottle. Preferably, the charge bottles are made of stainless steel, for example, 18—8 (18-Cr, 8-Ni— U. S. S. #316) stock, but other nonmagnetic metals not readily attacked by the vapors of uranium halides may be used if desired.

In order to assist in providing a soldered gas-tight joint between the closure and the bottle, the groove 133 is coated or plated with a metal easily wet by a low melting alloy, for example, Wood's metal. The plating (which for example may comprise a noble metal such as silver, gold, etc.) is shown, out of proportion for clarity, at 135 in Fig. 11.

The charge bottle 131 is secured to the hood 71 while being filled and closed by a cage-like frame 100. This frame comprises a split ring that grips the bottle 131 and a split collar that extends over the flange 75 on the hood. The split ring is made up of two parts 101 and 102 and the split collar consists of two semicircular parts 105 and 106. The part 102 is drilled at 117 and 118 and the part 101 is drilled and tapped at 119 and 120 to receive screws 103 and 104 by means of which the split ring is caused to clamp the bottle. Similarly, the part 106 is drilled at 127 and 128 and the part 105 is drilled and tapped at 129 and 130 to receive screws 107 and 108 which hold the collar parts together on the flange 75. The aforementioned parts of the frame 100 are usually made of brass.

The frame 100 also comprises a series of bolts 111, 112, 113, 114, 115 and 116 and cooperating nuts, such as 124, 125 and 126, which connect the ring and collar. By tightening these nuts the charge bottle 131, being securely held by the split ring, is forced toward the hood 71. This action applies pressure to an annular gasket 138, preferably made of rubber, positioned in the groove 139, and produces a vacuum-tight seal between the bottle 131 and the hood 71. A flat ring 109, also preferably made of rubber, serves as a cushion between the split collar of frame 100 and frangible flange 75 on the hood 71. The gasket 138 is of a bulk sufficient to prevent actual contact of the bottle top and the flange 75.

The cap 141 used for closing the mouth 132 of the charge bottle 131 comprises a flat disk-like main body or cover part and a depending skirt 142. This cap, intended for magnetic removal, is formed of magnetic material and is provided with a peripheral, depending skirt 142 of variable height so that when cap 141 is soldered into position it will be magnetically asymmetrical with reference to the axis of the container. In order to assist in providing a soldered gastight joint between the cap 141 and the bottle 131, the skirt 142 is coated or plated with a metal easily wet by the low melting alloy, Wood's metal, previously mentioned. The plating is shown, out of proportion for clarity, at 145 in Fig. 11. Preferably, the layer of wetting metal 135 coating the interior of the groove 133 and the layer of metal 145 coating the exterior of the skirt 142 are plated thereon and comprise a metal such as a noble metal (e. g., silver, gold, platinum, iridium, or osmium). A hermetic seal between the cap 141 and the bottle 131 is obtained more easily if, before the start of the sealing operation, a layer of the Wood's metal solder 146 is wiped onto the layer 145 carried by the skirt 142 and a ring of the Wood's metal solder 136 is melted onto the layer 135 carried within the groove 133. After the bottle 131 is filled and the sealing operation is carried out, the masses of solder 136 and 146 readily fuse together, forming a gastight seal between the cap 141 and the bottle 131.

The top of the cap 141 removably supports an electric heater 151, the heater 151 being secured in place by an arrangement including a screw 147 engaging a centrally disposed threaded hole provided in the cap 141. This arrangement accommodates heating of the cap 141 in order to melt the previously mentioned bodies of solder 136 and 146. The heater 151 includes a resistance element, one terminal of which is connected or grounded to the cap 141 and the other terminal of which is connected to a terminal post 152 in the form of a loop or eyelet. The circuit for the heater 151 may be completed, as illustrated diagrammatically in Fig. 9, by setting the notched end 64 of the rod 61 against the loop 152 and by connecting the rod 61 and the bottle 131 to a suitable current source 155, the circuit arrangement utilizing two contactors 153 and 154 and two connecting conductors 156 and 157, as well as a suitable switch (not shown). The heater 151 may be readily removed from the cap 141 by removing the screw 147 after the bottle 131 has been sealed and disconnected from the associated hood 71.

Considering now the mode of operation of the apparatus shown in Figs. 1 to 11, inclusive, the hopper 10 is filled with a mass of raw or crude hygroscopic material 161 (such as uranium hexachloride) in subdivided form through the conduit 11, and the plug 18 is fitted into the end of the conduit 11 in gastight relation. A quantity of glass or other relatively inert material 160 in the form of powder or small beads is placed in the container 20 in a position from which it can be later advanced toward the subliming zone for a purpose to be noted hereinafter; a previously prepared cap 141 is suspended upon the hook 83 carried by the rod 81 in the tubular extension 74; a previously prepared charge bottle 131 is secured and sealed to the hood 71 by the frame 100, the spout 73 being adjusted in the mouth 132 of the charge bottle 131; the receptacle 40 is secured to the tube 21; and the joints 28 and 29 are closed. Preferably, the joints 28 and 29, as well as the connections between the conduit 11 and the plug 18 are sealed in a gastight manner with ordinary sealing wax. Similarly, the connection between the tubular extension 12 and the Wilson seal 19, the connection between the tubular extension 23 and the Wilson seal 42, the connection between the tubular extension 24 and the Wilson seal 52, the connection between the tubular extension 25 and the Wilson seal 62, and the connection between the tubular extension 74 and the Wilson seal 90 are also sealed with sealing wax. The vacuum-testing tubes 19a, 46, 56, 66 and 96, respectively associated with the Wilson seals 19, 42, 52, 62 and 90 are suitably connected to the vacuum-producing apparatus and the Wilson seals mentioned are tested in order to insure that the apparatus as a whole is gastight. The ducts 13, 26 and 27 are then connected to the vacuum-producing apparatus, whereby the container 20 and the connected parts are evacuated to a relatively low pressure, such for example as $10^{-4}$ mm. Hg.

A portion of the crude uranium hexachloride 161 is introduced into the container 20 by suitably rotating or reciprocating the handwheel 17 in order to control the gate 15, and is positioned in the heating zone within the furnace, as shown at 163, by means of the hoe 43. Thereafter the subdivided glass or other inert material 160 is spread over the adjacent or feed side of the pile of crude uranium hexachloride, as shown at 164, thereby preventing or substantially preventing the flow of vapors toward the feed side of the apparatus; heat is then applied, causing volatilization of the uranium hexachloride, the vapor of which flows toward the cooler portion of the container 20 and condenses thereon, as shown at 165. Accordingly, it will be noted that the portion of the container lying between the heater 30 and the duct 25 functions as an air-cooled condenser; it may be additionally noted that when and if desired, supplemental cooling structure, such as a surrounding coil through which is circulated a cooling medium such as water, may be provided at this point.

The condensate of uranium hexachloride usually begins to appear when the charge has reached a temperature of approximately 80° C. However, temperatures somewhat in excess of 150° C., for example in the range of approximately 150° to 190° C., are preferred for the sublimation of this material at a practical rate. The sublimation of the $UCl_6$ may be carried to substantial completion by raising the temperature to about 210° C. for a short time (up to about thirty minutes) at the end of a run at the lower temperature mentioned. The use of the higher temperature for extended periods is ordinarily not desired because uranium hexachloride begins to decompose slightly at 100° C. and at an appreciable rate above 150° C. in vacuo.

The layer of glass 164 serves to retard or prevent the flow of volatilized uranium compound in the opposite direction. When the vaporization of the charge has been completed, the glass and residual matter from the charge is raked back and into the receptacle 40 as shown at 166, except for a portion which preferably is retained in the tube 20 between ducts 14 and 21 to serve as a vapor blocking layer for the succeeding mass of crude material being processed. Another portion of the crude material 161 is then admitted to the tube 20 from the hopper 10 and is positioned in the heating zone as shown at 163, after which it is covered with a layer 164 of subdivided glass and nonvaporized material from a previous run or runs, and another vaporization cycle is conducted. These cycles are repeated without breaking vacuum until the supply of crude uranium hexachloride 161 has been exhausted.

The condensed uranium hexachloride 165 that collects on the cooler portions of the wall of the container 20 is chiseled away, preferably after each sublimation, with the chisel 54 and raked into the duct 22 with the hoe 53. The sublimate is deposited on the inside of the tube 20 in a zone ordinarily extending from about one-half inch to twelve inches from the edge of the hot zone, with the thickest deposit usually occurring in the first three inches. The uranium hexachloride that sublimes below 170° C. condenses in this three-inch zone in a layer usually about ⅜-inch thick. This deposit has a mechanical strength about equal to that of anthracite coal and must be chiseled off the wall. However, the adhesion between the deposit and the glass is somewhat weaker than its internal strength or cohesion, so that the deposit scales or breaks off in large pieces, particularly when the wall surface of the container 20 is clean. Pieces too large to pass through the duct 22 may be chopped into smaller pieces by means of the pointed rod 61.

Although by this method all of the sublimed and purified uranium hexachloride may not be completely removed from the wall of the container 20, and although some slight amount of uranium hexachloride vapor may have seeped through the glass barrier 164 and deposited in solid form in the feed end of the tube 20, it is unnecessary to clean the tube after each run as dry air (which might remain in extremely small amount in the apparatus) causes no visible decomposition of the uranium hexachloride. It is therefore customary practice to clean the entire apparatus only after a number of runs.

A single run of the type described above usually requires a full working day and produces approximately one-half kilogram of highly purified uranium hexachloride, these figures being exemplary and based upon the particular apparatus chosen by way of illustrating the invention.

Care should be taken to avoid any jarring of the feed material during the subliming operation, as this may cause flakes of this material to break loose and be blown into the condensation zone by the stream of uranium hexachloride vapor, and thus eventually contaminate the purified sublimed uranium hexachloride. Such contamination is not desirable since the presence of impurities may interfere with satisfactory operation of the calutron.

Instead of treating an impure uranium hexachloride to obtain the desired highly purified uranium hexachloride product as described above, uranium pentachloride may be employed as the starting material for the production of uranium hexachloride by the reaction mechanism disclosed and claimed in the copending patent of Francis A. Jenkins, No. 2,572,156, October 23, 1951; i. e., by the disproportionation of uranium pentachloride into uranium hexachloride and uranium tetrachloride under the influence of heat. When uranium pentachloride is used as the starting material 161, it is heated in the subliming zone to a temperature ranging from about 80° to about 180° C., but preferably toward the upper end of this range. Temperatures as high as 250° C. may be employed for short periods, so as not to cause undue decomposition of the produced uranium hexachloride. At this temperature, and under high vacuum, the uranium pentachloride is decomposed into uranium tetrachloride and uranium hexachloride, the latter passing out of the heated zone in the form of vapor which is condensed in the cooler portion of the container 20 from which it is removed and loaded into the charge bottle 131, as more fully described above. A residue, mainly uranium tetrachloride, of over 50% of the original material is left in the sublimation zone. As this residue accumulates in the sublimation zone during and as a result of the disproportionation of successive charges of uranium pentachloride and the attendant vaporization of uranium hexachloride produced thereby, the undesired accumulation of residue is raked into the duct 21 and collected in the receiver 40 at desired intervals for suitable salvage operations, preferably however retaining each time sufficient of the residue in the container 20 to serve as a blocking layer for the succeeding charge of uranium pentachloride that is positioned in the subliming zone.

Uranium tetrachloride of more or less impure form may also be used as the starting material 161 where it is desired to prepare and/or package this compound in highly purified form for subsequent treatment in a calutron or for any other purpose. In such purification and packaging, the apparatus functions in a manner generally similar to that already described for the case of uranium heaxchloride, except that a considerably higher temperature, such as 512° to 520° C. is preferably employed for subliming the uranium tetrachloride since the latter is considerably less volatile than the former. In general, a temperature of at least 500° C. is preferably employed. Condensation of purified uranium tetrachloride in the cooler portions of the tube 20 is ordinarily first observed at a temperature of about 365° to 380° C., under the pressure conditions already set forth. However, temperatures of from approximately 500° to 550° C. or higher are required for the sublimation of the material at a practical rate. When these higher temperatures are employed it is desirable to provide additional support for the tube 20 to prevent any sagging of the tube due to the higher temperatures necessary for the sublimation of uranium tetrachloride at a practical rate.

It will be understood that when a sufficient quantity of sublimate of highly purified uranium hexachloride (or of highly purified uranium tetrachloride, when the starting material 161 comprises more or less impure uranium tetrachloride as described above) has been deposited on the walls of the container 20 as shown at 165, the deposit is removed from the walls, broken into sufficiently small particle size to pass through duct 22, and scraped into the duct by suitable manipulation through the corresponding Wilson seals of rod 51 carrying scraper 53 and chisel 54 and rod 61 having the pointed end 64. In this manner sufficient purified sublimate is collected to fill charge bottle 131 to the desired level. Where two or more sublimation cycles are required to obtain the desired quantity of sublimate care is taken to maintain the vacuum in the system between successive cycles, as previously mentioned.

Having collected the desired quantity of purified sublimate in the charge bottle 131, the rod 61 is manipulated so that hook 63 lifts the telescopic spout 73 from the filling position shown in Fig. 1 to the capping position shown in Fig. 8, the rod 81 with its hook 83 carrying the cover 141 is manipulated to move the cover from its retracted filling position shown in Fig. 1 to the position shown in Fig. 8, and the cover is thereupon placed in the capping position shown in Fig. 9 with its skirt 142 disposed in groove 133. (It will be understood that the groove 133 in the top of the charge bottle 131 and the skirt 142 of the cap 141 will have been prepared previously for the soldering operation, in the manner described more fully above in connection with Fig. 11.) Rod 81 is then manipulated so that its hook 83 supports the spout 73, thereby freeing rod 61 with its hook 63 for another purpose, as shown in Fig. 9. As also shown in that figure, rod 61 is then manipulated so that its notched end 64 bears firmly upon eyelet 152 that forms a terminal post for the heater element 151 attached to the cover 141 of the charge bottle. Now upon completing the electrical circuit including the heater element 151, the latter is energized and thereby supplies sufficient heat to cap 141 to melt the entire mass of Wood's metal filling groove 133. The circuit is then opened and, after cooling, the Wood's metal forms a hermetic seal between the skirt 142 of the cover 141 and the top of the charge bottle 131. The frame 100 may then be unfastened and the charge bottle 131 with its hermetically sealed contents removed from the apparatus. Another cover 141 and charge bottle 131 (previously prepared for the soldering operation) may then be placed in position in the apparatus, and the purifying and sealing operations resumed.

Referring now to Figs. 12 and 13, there is shown a modified apparatus designed solely for the sealing under vacuum of charge bottles containing hygroscopic material that may be similar in nature to any one of the materials already described. In this modification the tube 222 corresponds to the tube 22 in the modification of Fig. 1 so far as the location and the function of serving as a duct for evacuating air or other gas from the hood 271 are concerned. However, it does not have the function of transmitting the charge to the charge bottle that is one of the purposes of the tube 22. The hood 271 is constructed similarly to the hood 71 and has a tubular extension 274, closed by means of a Wilson seal 290. A corresponding rod 281 having a hook 283 and a handwheel 285 at its opposite ends operates in the tubular extension and through the Wilson seal. A charge bottle 231 is positioned against the flange 275 on the hood and a cap 241 carrying a heater 247 is located in the hood over the mouth of the bottle 231. A suitable frame (not shown) is provided to clamp the charge bottle to the hood during operations, the frame being similar to frame 100 shown in Fig. 11 and therefore not requiring further discussion. Also, a suitable current source (not shown) is provided for the heater element 247, the circuit for same being completed through the charge bottle 231, rod 281 and hook 283, the latter thus functioning similarly to rod 61 as already described in connection with Fig. 9.

The air or other gas within the hood 271 is, during the operation of this device, evacuated through the vertical tube 222 into the horizontal tube 210 from whence it enters a trap device for condensing moisture and the like, comprising a bulb 211 about which is positioned a container 212 for liquid air or similar cooling medium 213. Noncondensable gases leave the bulb 211 through vertical exit tube 214 and pass through horizontal tube 215 and mercury diffusion pump 216 into horizontal tube 217, vertical tube 218, and horizontal tube 219 to a vacuum pump. A drying tube (not shown) provided with a powerful desiccant, such as phosphorus pentoxide, is preferably inserted in the line 219 in order to dry the stream of air that is admitted when the apparatus is let down to atmospheric pressure.

A McLeod gauge, generally indicated at 220, is joined to the horizontal tube 215 at the point 221. This gauge, which is a well-known device and is described in "Experimental Atomic Physics," Hornwell and Livingood, 1st Ed., 1933, page 433, is utilized in determining the degree of vacuum within the apparatus from time to time. This gauge has a pivotal joint 225 (shown in greater detail in Fig. 13) for shifting the location of the mercury contained therein. The arms of the joint are shown at 226 and 227. Glass columns 228 and 229 add strength and rigidity to the device, thereby increasing its ruggedness.

The mercury diffusion pump is of a conventional type comprising a vaporizing vessel or boiler 230 heated by an electric resistance coil 230a and containing a pool of mercury 232. Mercury vapor produced in the boiler leaves the boiler through tube 233 and, after having its direction of flow reversed by the cap 234 supported on glass column 243, flows concurrently with the gas being evacuated from hood 271 in the condenser tube 235. The curtain of mercury vapor flowing past the annular opening between the cap 234 and the bulb in which it is situated promotes the removal of residual gas from the hood to be evacuated, in the well-known manner characteristic of diffusion pumps. The condenser tube 235 is surrounded by a jacket 236 defining a space for the circulation of a cooling liquid such as water. The cooling liquid enters through inlet 237 and leaves through outlet 238. The mercury condensed in the condenser tube 235 flows therefrom through inclined tube 239 and collects in trap 240. When the condensed body of mercury 241 collects to a sufficient height in the trap, it overflows through tube 242 back into the boiler 230 where it combines with the main body of mercury for reevaporation to continue the cycle of pump operation.

It will be understood that after a charge bottle 231 containing a charge of uranium chloride that is to be hermetically sealed within has been secured in place against the flange 275 and the desired degree of vacuum (of the order of $10^{-4}$ mm. of Hg absolute) placed upon the system, the sealing operation is carried out in a manner that will be perfectly apparent from a consideration of Fig. 12 taken with the previous description of the sealing operation as applied to charge bottle 131, and which for brevity need not be repeated.

For the sake of brevity, the vacuum-producing apparatus that is required for the apparatus illustrated in Fig. 1 has not been shown in detail and it will be understood that it may be generally similar in nature to that already described in connection with Fig. 12. However, due to the much greater size of the apparatus of Fig. 1, the accessory apparatus preferably comprises two liquid air traps and one mercury diffusion pump. In addition, two drying tubes provided with magnesium perchlorate and phosphorus pentoxide are employed to dry the stream of air when the apparatus is let down to atmospheric pressure.

The extra vacuum connecting line 21 greatly improves the operation of the apparatus of Fig. 1. It facilitates bringing the system under vacuum, particularly on first pumping down, because gases are removed directly from the discharge end of the system without having to pass through the dam of packed powdered raw material (charge) to the vacuum-connecting line 26. Similar remarks apply to the vacuum-connecting line 13 which may be connected to the same vacuum-producing apparatus as are lines 26 and 27. Producing a high vacuum in the system shown in Fig. 1 would be a very slow operation if a large volume of gases had to be evacuated through the tube 26 alone. In addition, any gas accidentally introduced during operation, for example by leakage at a Wilson seal, passes out of the device without passing over the heated charge.

When processing corrosive materials such as are described herein, it is desirable—particularly in view of the relatively elevated temperatures employed—to use specially selected materials of construction for the selected apparatus. Because of its heat resistance, Pyrex glass is the preferred material for constructing the principal parts of the apparatus. The rods 16, 41, 51, 61 and 81, the hoes 43 and 53, the hooks 63 and 83 and the charge bottle 131 are preferably made of stainless steel stock, such as 18—8 (Cr-18, Ni-8 U. S. S. #316), in order to resist corrosion by chlorine-containing materials inside the apparatus. The chisels or spikes 44 and 54 are made of tool steel. The preferred material for making the cap 141 is soft iron but any other material that is sufficiently magnetic to be lifted from the bottle mouth by the magnetic field of a calutron and which has low magnetic retentivity is also suitable for this purpose. The iron commonly used is not easily wet by molten Wood's metal (the material ordinarily used for soldering the cap to the charge bottle) so it is desirable, as explained above, that the skirt 142 on the cap 141 be coated or tinned with a metal that is readily wet by such an alloy. The Wood's metal referred to above is a very low-melting material, usually the quaternary alloy 50 Bi, 25 Pb, 12.5 Sn and 12.5 Cd. This substance melts at 65.5° C. A silver solder comprising 63 Ag, 30 Cu and 7.5 Zn is especially suitable for tinning the skirt on the cap.

As illustrated above, the subliming container 20 is about 2¼ inches in diameter and 50 inches long, having a heater providing a hot zone for sublimation that is about 10 inches long. It will be understood, of course, that these dimensions are given merely by way of illustration of one particular embodiment of the apparatus, and that they may be varied over a wide range, if so desired. The subliming operation should be carried out in a vacuum of $10^{-4}$ mm. of mercury or better.

Many of the advantages of the previously described apparatus and process will be apparent from the description and drawings. Particular attention may, however, be advantageously directed to certain features. By this invention a process has been provided whereby a highly hygroscopic uranium compound may be purified and/or packaged in a container that is adapted for use in a calutron, without exposing the compound to atmospheric conditions. In this manner the deterioration and decomposition of the compound is prevented during storage, transfer, etc. An apparatus has also been disclosed which is suitable not only for the purification and packaging of hygroscopic uranium compounds under vacuum, but also for hermetically sealing the vacuum containers. Obviously the disclosed process and apparatus may be used for handling of other hygroscopic materials where superior conditions of protection are desired.

Probably many apparently widely different embodiments of this invention may be made without departing from the principle, breadth and spirit thereof and it is to be understood, therefore, that this invention is not limited to the specific embodiments thereof except as encompassed in the following claims.

What is claimed is:

1. The process of preparing and packaging uranium hexachloride comprising heating uranium pentachloride at a temperature below about 250° C. whereby uranium hexachloride is formed and exists as a vapor, condensing the vapor, thus obtained the hexachloride as a sublimate deposited in situ as a solid in the condensing zone, thereafter removing said solid deposit by splitting the same and separately charging the broken-apart sublimate into a container, and hermetically sealing the container, all while maintaining the uranium hexachloride under vacuum.

2. An apparatus for purifying a relatively volatile normally solid material that condenses directly to the solid state from the vapor state comprising an elongated, horizontally disposed, tubular chamber having a heated, centrally disposed, subliming zone and a cooled condensing zone axially spaced from said subliming zone and exhaust ducts leading to means for producing a high vacuum in said chamber, the ducts being located adjacent the opposite end portions of said chamber and so disposed as to produce a vacuum condition in said condensing zone and in the zone lying on the opposite side of said subliming zone, respectively, whereby a vacuum may be produced in the apparatus without setting up a fluid current over the material being processed, a feed hopper for a solid raw material that is capable of producing vapor of the desired relatively volatile normally solid material under the conditions obtaining in the heated subliming zone, the feed hopper being disposed above said chamber and communicating with the latter on the side of the subliming zone opposite the condensing zone, and a rigid implement extending axially of said chamber and manually operable from the exterior of the chamber for packing solid raw material from the feed hopper in the subliming zone.

3. Apparatus as defined in claim 2 and including a discharge conduit extending downwardly from the condensing zone of said chamber and terminating in an increased diameter hood adapted to sealingly engage the mouth of a storage container, an integral, tubular portion extending laterally from said hood, elongated rigid means disposed within said latter portion and movable longitudinally and rotatably from the exterior of said portion for transporting a container closure from said portion into container sealing position in said hood, and means controllable from the exterior of said hood for hermetically sealing the closure upon said storage container.

CHARLES H. PRESCOTT, Jr.

(References on following page)

REFERENCES CITED

The following references are of record in the file of this patent:

UNITED STATES PATENTS

| Number | Name | Date |
|---|---|---|
| 420,116 | Smith | Jan. 28, 1890 |
| 700,584 | Vautour et al. | May 20, 1902 |
| 908,140 | Rigby | Dec. 29, 1908 |
| 1,109,762 | Johnson | Sept. 8, 1914 |
| 1,159,865 | Pier | Nov. 9, 1915 |
| 1,344,664 | Wander | June 29, 1920 |
| 1,509,916 | Waite | Sept. 30, 1924 |
| 1,564,044 | Brown | Dec. 1, 1925 |
| 1,877,726 | Noble | Sept. 13, 1932 |
| 2,258,374 | Amati | Oct. 7, 1941 |
| 2,284,551 | Alexander | May 26, 1942 |
| 2,331,524 | Wade | Oct. 12, 1943 |

OTHER REFERENCES

Moore, Preparation of Metallic Uranium, Transactions of the American Electrochemical Society, volume 43, pages 317–328, (1923).

Friend, Textbook of Inorganic Chemistry, volume VII, part III, pages 294 and 295, (1926).